United States Patent
Vallur

(10) Patent No.: US 10,587,627 B1
(45) Date of Patent: Mar. 10, 2020

(54) DETECTION OF FLOODING OF UNWANTED MESSAGES

(71) Applicant: Syniverse Technologies, LLC, Tampa, FL (US)

(72) Inventor: Ramakanth Vallur, Karnataka (IN)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/552,527

(22) Filed: Aug. 27, 2019

Related U.S. Application Data

(60) Provisional application No. 62/724,942, filed on Aug. 30, 2018.

(51) Int. Cl.
*H04L 29/06* (2006.01)
*H04L 12/58* (2006.01)
*G06N 20/00* (2019.01)

(52) U.S. Cl.
CPC ........... *H04L 63/108* (2013.01); *G06N 20/00* (2019.01); *H04L 51/12* (2013.01)

(58) Field of Classification Search
None
See application file for complete search history.

(56) References Cited

U.S. PATENT DOCUMENTS

| 10,218,726 B2 * | 2/2019 | Vasseur | H04L 41/0893 |
| 2005/0138413 A1 * | 6/2005 | Lippmann | G06F 21/577 726/4 |
| 2013/0086017 A1 * | 4/2013 | Chao | H04L 63/0245 707/698 |
| 2015/0067533 A1 * | 3/2015 | Volach | G06Q 10/107 715/752 |
| 2015/0188751 A1 * | 7/2015 | Vasseur | H04L 41/0613 709/224 |
| 2015/0195146 A1 * | 7/2015 | Di Pietro | H04L 43/0876 370/230 |

OTHER PUBLICATIONS

Kaur et al., A survey of data mining and social network analysis based anomaly detection techniques, Egyptian Informatics Journal (2016) 17, 199-216.
Kornblum, Identifying almost identical files using context triggered piecewise hashing, Digital Investigations 3S, 2006 S91-S97.
Benigni, Detection and Analysis of Online Extremist Communities, CMU-ISR-17-108, May 2017, 1-143.

* cited by examiner

*Primary Examiner* — Fatoumata Traore
(74) *Attorney, Agent, or Firm* — Anton J. Hopen; Smith & Hopen, P. A.

(57) ABSTRACT

Application of streaming machine learning clustering algorithms enables finding clusters of messages (P2P text messages, WHATSAPP, tweets) sharing the same content. Such clusters may be analyzed for finding out offensive messages, unwanted or spam messages, and rumors and take corrective actions as needed. The solution enables visualization of data and/or messages and identification of clusters as the solution works on the data and aggregates data into clusters over time intervals. Corrective actions may be applied on selected clusters based on visualized data clusters or by automated application of defined rules.

19 Claims, 9 Drawing Sheets

Fig. 3
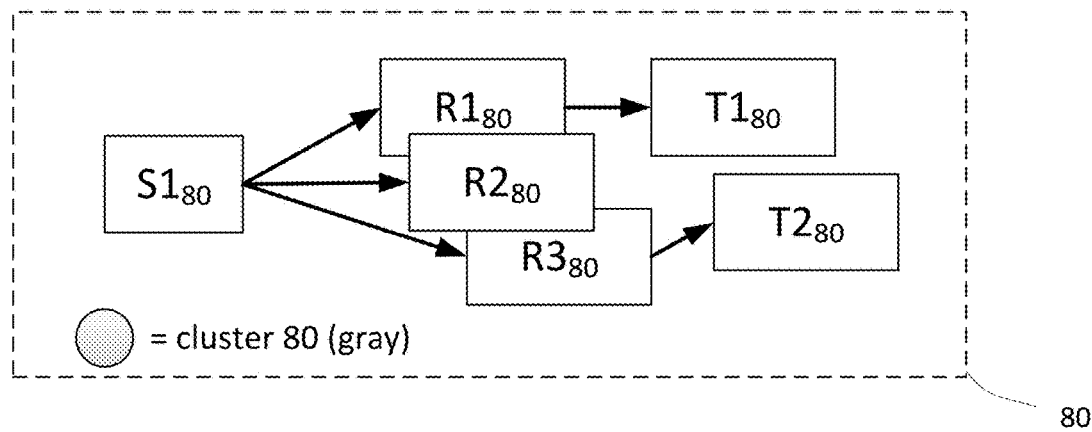
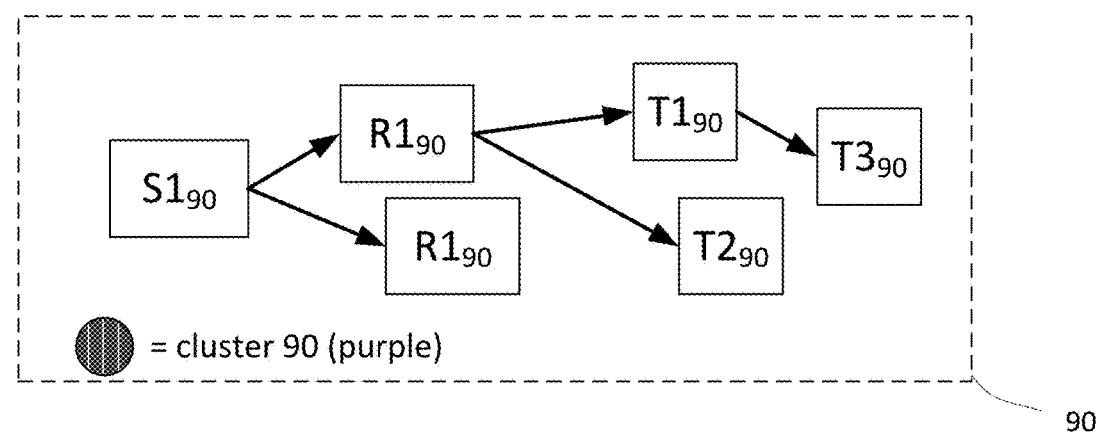
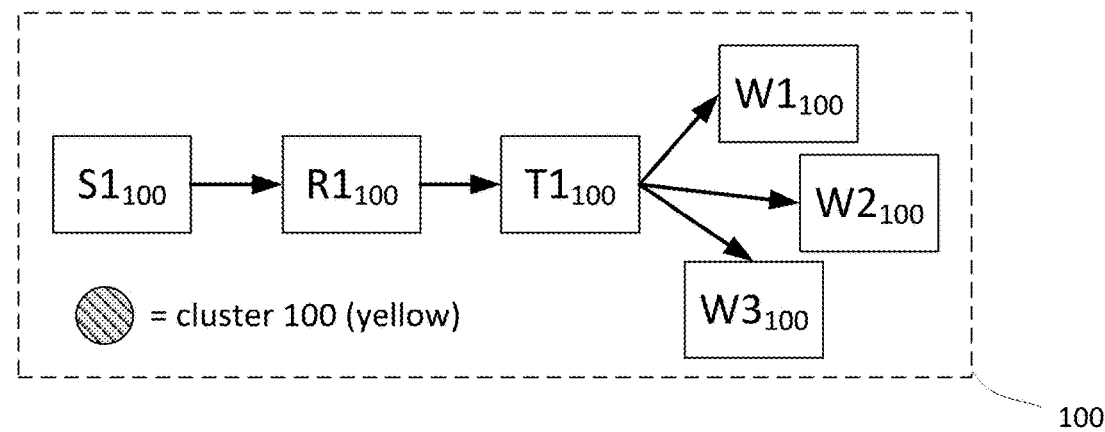

DETECTION OF FLOODING OF UNWANTED MESSAGES

CROSS-REFERENCE TO RELATED APPLICATIONS

This application claims priority to U.S. Provisional Patent Application No. 62/724,942, by the same title, filed Aug. 30, 2018, the entirety of which is incorporated herein by reference.

BACKGROUND OF THE INVENTION

Text messages using SMS, WHATSAPP forwards, and messaging applications provided by TWITTER and FACEBOOK are sometimes used to cascade messages through the network downstream. Sometimes, these repeated forwards result in loops, the original sender receiving the message through the network.

This capability of repeated forwards down the network permits the spreading of unwanted messages, referred to as spam, and for dissemination of information of uncertain or doubtful truth (e.g., rumors). Corrective actions may be initiated if this symptom is detected early. The challenge is to apply rules for detection of like-messages with the same/similar content and for identifying the proliferation of messages flowing through the network.

Spam detection through clustering is known. Current methods typically operate on a snapshot of data to build clusters for analysis. This method is optimal if there is a burst of messages from one or more senders in an interval.

However, the spread of unwanted messages often occurs over a period of time and sampling for shorter intervals may not always result in observable clusters. This requires a dynamic method where the data for a specific interval is merged with the clustered data from the previous time frame(s) to form revised clusters such that configured monitors analyze these clusters for alerts/actions.

BRIEF SUMMARY OF THE INVENTION

The present invention is the application of unsupervised clustering algorithms like DBSCAN on a real-time big data stream (eliminating outliers or distinct messages) to focus on suspect clusters, and analysis of such clusters using graph processing algorithms for detection and taking actions.

Application of Streaming Machine Learning Clustering algorithms enables finding clusters of messages (P2P text messages, WHATSAPP, TWITTER messages) sharing the same or similar content. Such clusters may be analyzed for finding offensive messages, unwanted or spam messages, and rumors so that corrective actions may be taken. This invention enables visualization of data and/or messages and identification of clusters as the solution works on the data and aggregates it into clusters over a period of time. Corrective actions may be applied on selected clusters based on visualized data clusters or by automated application of defined rules.

The current state of the art employs density-based algorithms used for spam detection based on clusters. The current invention takes this a step further to analyze such clusters for building the real-time view of senders and recipients that form the chain/graph with supporting meta-data, alerting based on looping, generate alerts on looping at different levels of the graph and/or chain/graph crossing certain levels in the hierarchy, providing information to recipients on looping/levels of forwards, and the ability to implement actions based on configured alerts.

P2P messaging service operators can leverage this invention to identify spread of unwanted messages through UI and monitoring/alerting interfaces, and take actions (automated/semi-automated/human action). This enables the ability to implement automated blocking of senders and content that helps operators protect their customers. Also, operators can analyze such incidents to track any offensive operators/sender networks for actions. This invention can be applied for A2P messaging platforms as well. In addition, this invention can be applied for other channels like IP messaging services like FACEBOOK, and WHATSAPP.

Data related to delivered messages is organized into time intervals. Each interval has a set of messages, each message has a Sender that originates a message, intended Recipient for the message, message content, and relevant timestamps. These are the detailed steps:

a) Message content is processed to form feature vectors using one of WORD2VEC, fuzzy hash or other methods.

b) Using a clustering algorithm, such messages are organized into clusters based on density removing sparse individual messages/clusters.

c) At this step, potential/all identified clusters for further observation and consolidation are identified.

d) Each cluster has a sub-set of messages taken for the interval. Though the clustering is based on message content, the meta-data for each message, Sender and Recipient with associated message delivery timestamps, is tagged for each data point.

e) For each message in the cluster, graph construction/elaboration phase starts. The graph is directed from Sender to Recipient and is chronologically ordered from left to right. The process of construction/elaboration is briefed below:

i. For each message, identify if the Sender of the message is already a node in the constructed graph. If not, add two nodes, one for Sender and the other for Recipient with a directional edge pointing from Sender to Recipient.

ii. If the Sender already exists, and Recipient doesn't exist, add a new node for this new Recipient and an edge with timestamp.

iii. If the Sender doesn't exist, and Recipient exists, add a new Sender node with a directional edge time-stamped from Sender to Recipient.

iv. If both Sender and Recipient exist, then add an edge from Sender to Recipient.

f) At the end of graph construction/elaboration phase, the outcome would be a new/elaborated graph corresponding to each cluster.

i. At this point, loop detection algorithm is run on this graph that results in number of loops, and metrics related to each loop like traversal path for each loop, number of participants, time taken for the looping, and others. A loop is defined as a traversal path in which Sender receives the same message that was sent earlier by Sender.

ii. Breadth and Depth of the tree is computed iii. Detection of configured 'monitored keywords or phrases' is completed and supporting metrics like number of such messages are captured The graph appears as a social network of communications that gets updated with every interval. There are several graph libraries that enables construction/elaboration of graphs based on parameters above (sender to recipient directed node) with supporting functions for computation of breadth and height. Also, algorithms based on breadth-first search (BFS) exist for detection of looping within a graph.

A monitor is a specific function that runs on a graph with an objective. An example of a monitor is loop detection in a graph. Another example could be detection of unwanted/spam content. These monitors are programmed to operate on this graph and it may be associated with an automated/manual action. A default action associated with a loop detection feeds User interface for high lighting the portion of the graph that is part of the loop. In general, an action is a programmable code that defines instructions for execution.

One such action could be block sender that identifies one or more senders and sends an event to message delivery platform. On receiving this event, the message delivery platform blocks specified senders for a specified time. Another action could be block content. This approach is based on configurable monitors and actions that require human intervention for specifying thresholds (like number of loops and associated metrics).

Another way as outlined is based on Machine Learning that learns the social network of senders and recipients as interactions grow. The ML algorithm learns connectivity network along with other parameters like spread of communication of messages over space and time (and type of content if the ML algorithm can be trained with such data). In case of spam/flooding of unwanted messages, the pattern of social network would break in some way in number of loops, spread of messages in space over a shorter period, etc. This can be flagged by the ML algorithm programmed for detecting anomalies.

There are three integration points between Messaging platform and the service that implements the proposed invention:

Messaging Platform to Service:

Messaging services generate data into a data store/lake for supporting business and operations support functions. The service that implements this invention takes this data as input. This data store contains meta-data of a delivered message that includes sender, recipient, timestamps, and other details. This serves an input to the real-time DBSCAN algorithm. For ensuring privacy of data content, hashing and/or conversion of message text into feature vectors using word embedding may be applied.

Service to Messaging Platform:

The service identifies actions such as block senders, content that feed into databases for block-action. Messaging platform looks into these databases for implementing the actions determined by the service.

Service to Messaging Platform UI:

Provides visual indicators about levels of forwards, looping into the message content as appropriate. Each time frame generates a view of message transfers and associated clusters for the UI. This visual representation is re-built as this view is consolidated with the data of the next time frame eliminating sparse clusters or individual messages. This view is presented in near real-time with the help of UI highlighting clusters that are building up with consolidation of every time frame. The ability for a monitor (human or semi-automated/intelligent system) to zoom into a cluster to view the network graph of that cluster facilitates remedial action.

DBSCAN should be applied on a large/big data of a snapshot of data and consolidation of snapshots to revise clusters in real-time. However, improved implementations of DBSCAN may process real-time stream of data (fork scans on smaller data sets and consolidate). Systems may combine density-based clustering algorithms (like DBSCAN) with the data stream processing paradigm Complex Event Processing (CEP) to obtain continuous detection of spatial clusters.

Another embodiment of the invention relates to identification of unwanted message forwards from informative and actionable forwards. There are two methods that can be employed. A first method is driven by recipient of a message, the message is ranked as offensive/unwanted on a scale of 1-5 or binary (yes/no). This data is used to rate a message on forwards. In a second method, keywords or phrases that are considered offensive/unwanted are inputted by authorized sources or automatically determined based on the recipients rating of indicator of offensive/unwanted message.

Alerting and action responsive to flagged messages may be taken in a number of ways. They include applying a rule for blocking content to prevent any further forwards. The sender (or senders) may be blocked that have been involved in more than one such chain of unwanted messages. A visual indication is displayed on a UI showing the number of levels of forwards a message goes through which may signal looping back of the message. A visual or machine-readable indication is generated of the number of recipients that marked a message as offensive.

BRIEF DESCRIPTION OF THE DRAWINGS

For a fuller understanding of the invention, reference should be made to the following detailed description, taken in connection with the accompanying drawings, in which:

FIG. 3 is a collection of network graphs of clusters showing flow of messages among senders and recipients.

DETAILED DESCRIPTION OF THE PREFERRED EMBODIMENT

Figure 1:
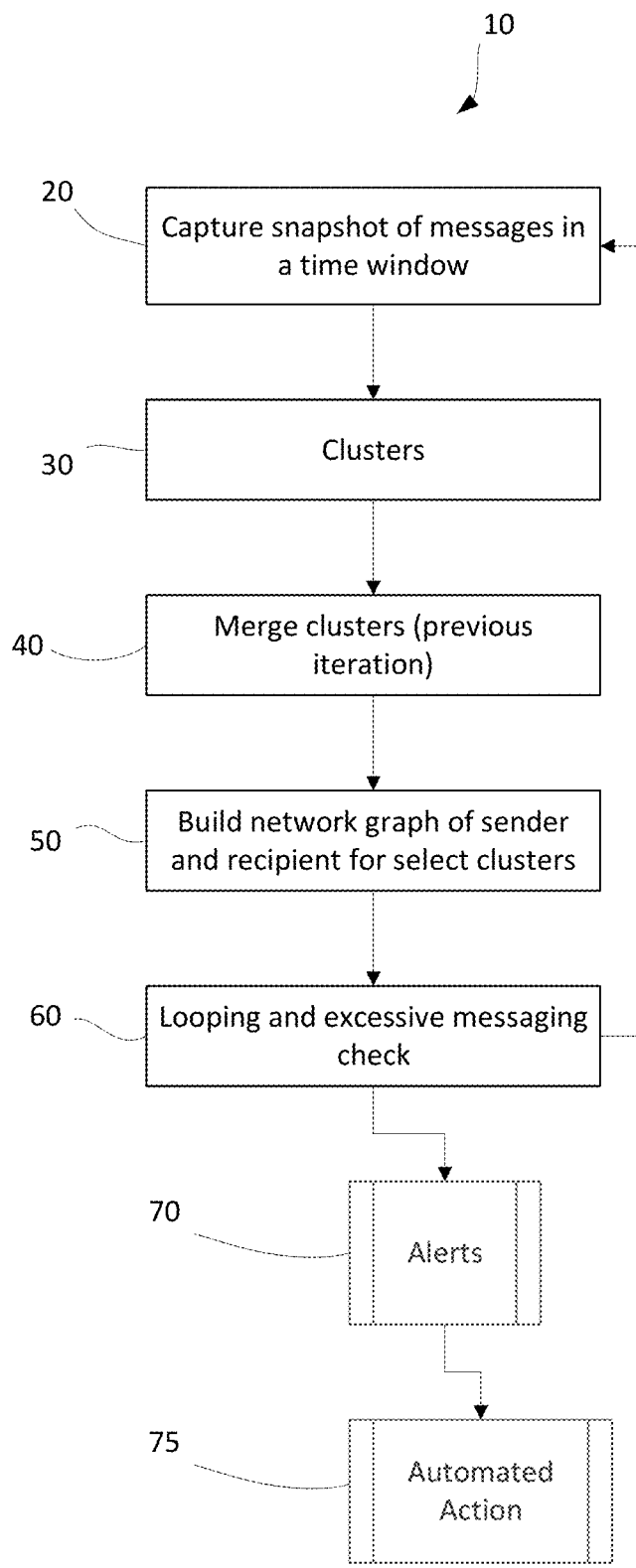
FIG. 1 is a diagrammatic view of a solution outline.

Messaging applications support cascading of messages to contacts in their network. Sometimes, a message is repeatedly forwarded down through subsequent (2nd, 3rd, and so on) levels of contacts in the hierarchy. While this capability can serve a cause or purpose, it can be used for spreading of unwanted or spam or for spreading rumors. Incidents of WHATSAPP forwards spreading rumors have been reported. Message traffic may include text (SMS), WHATSAPP, or any form of message enabled by OTTs.

A long felt need in the art exists to identify the trend of unwanted messages spreading through the networks of contacts. The spread of messages increases with time, sometimes across geographies, and is associated with looping (originator of the message receiving the same content). Such unwanted messages when detected during the spread could be actioned. The unwanted messages could be associated with the use of certain words and action may be initiated to stop the spread by blocking offending senders.

The solution employs 2 steps in each iteration:

Step 1: Unsupervised machine learning algorithms, clustering, to be specific, are applied to find clusters within a set of messages taken during certain period. This step groups messages with the same or similar content thus forming distinct clusters. Distinct or less dense messages are considered 'noise' in this context and these messages are dropped from further analysis. One such algorithm is DBSCAN. DBSCAN works well in identifying clusters without explicit mention about them. However, the epsilon parameter of DBSCAN that determines the proximity for clustering should be as small a value as possible, ideally zero, in case of matching identical content.

Many clustering algorithms require explicit specification of the number of clusters to find in the data set/stream. This will not work for solving the instant problem. This is where the DBSCAN comes in as it works on density of clusters removing sparse clusters and individual data points. In case of P2P messages the data points are individual or form sparse clusters that DBSCAN can eliminate. The elimination of sparse clusters/individual data points removes the need for handling big data when the data of previous time frame is being consolidated with the current time frame to form revised clusters.

Step 2: Once the clusters are identified, each cluster is analyzed, and a network graph is constructed based on sender and recipient of each message in the cluster and ordered chronologically. If a sender has originated a message to larger set of recipients, the graph has higher fan-out of branches.

In the next iteration, Step 1 is applied on a new set of messages taken during the next sample period. By applying streaming machine learning/clustering algorithms, revised clusters are identified. At the end of Step 1, size of clusters identified in the previous iteration could increase or stay unchanged and there is a possibility of new clusters. Step 2 is now applied on clusters of interest to build revised network graph.

If the size of a cluster continues to grow (in depth and breadth) and/or looping is detected, as iterations progress, such clusters are marked for further analysis and for application of corrective actions. The looping referred here is a case when the message sent by an original sender reaches the same sender as the message is forwarded through the network.

As the network graph is arranged chronologically, it is possible to identify senders spreading spam or rumors. Also, this graph can be used to find out how the network spread through time and space. If the message is found to be offensive (spam or rumor), manual or automated actions may be initiated to block offensive senders.

Turning to FIG. 1, in step 20, messages sent during a time window of observation are captured. This data includes meta data fields such as Sender, Recipient, Message content, and Message submission time. In step 30, these messages are fed to a Streaming Machine Learning algorithm that applies clustering for identifying cluster of messages with the same/similar content. In step 40, sparse messages are ignored. Clusters identified for current iteration are merged with the clusters identified in the previous iteration. New set of clusters are formed, updated, and dropped. In step 50, a network graph of clusters of interest or all clusters is built with each edge connecting a sender to recipient of the message. In step 60, the process checks for loops within the graph and for excessive depth and breadth of network graph which is then used for raising alerts 70. If the criteria matches, (one of the criteria could be loops within the graph) alerts 70 are generated for taking corrective actions such as automated actions 75 to restrict sender or message dissemination.

Figure 2:
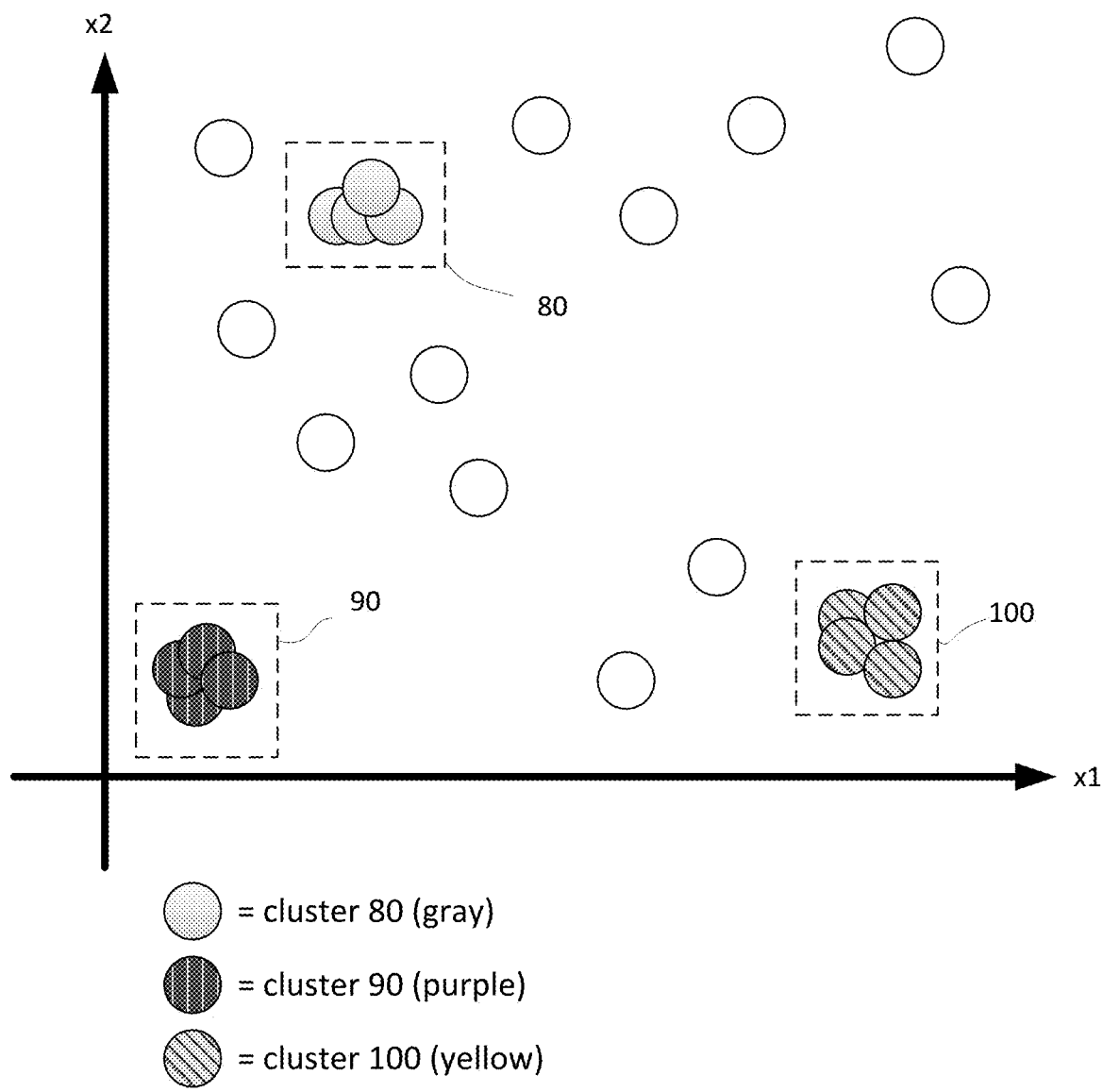
FIG. 2 is a graph showing message clusters.

FIG. 2 shows a representation of a message wherein the x1 parameter is set to the x-axis and the x2 parameters is set to the y-axis. In this example, the x1 parameter is a hash of the message and the x2 parameter is a numerical word count of the message. Hashing can enable the clustering of messages with similar content even though usual identifiers are intentionally obfuscated or inherent change as messages cascade through forwarding thus modifying origin, destination, sender, timestamps and the like. An embodiment of the invention may apply a "fuzzy" hashing algorithm (also known as piecewise hashing) to find similar message contents as opposed to being limited to identifying homologous files (exactly the same). Alternatively, word embedding enables mapping of a message text to a feature vector which is a one-dimensional array of mapping of words of text into real numbers. The dimensions of such a vector depends on the vocabulary of words. There are various methods for conversion like WORD2VEC, GLOVE, and others. These machine learning models identify synonyms and act on only those words that contribute to the message. Such vectors when submitted to DBSCAN produce meaningful clusters. Accordingly, the x1 parameter in FIG. 2 may be derived from word embedding.

Clusters 80 (gray), 90 (purple) and 100 (yellow) may be visually aggregated for an end-user to evaluate and/or may also be quantitatively grouped for automated identification of such clusters without user intervention.

In FIG. 3, message flow for each cluster 80, 90 and 100 are shown. For cluster 80, sender $S1_{80}$ sends a first message to recipients $R1_{90}$, $R2_{90}$ and $R3_{90}$. $R1_{80}$ forwards message to $T1_{80}$ and $R3_{80}$ forwards to $T2_{80}$. For cluster 90, sender $S1_{90}$ sends a second message to recipients $R1_{90}$ and $R2_{90}$. $R1_{90}$ then forwards to $T1_{90}$ and $T2_{90}$. $T1_{90}$ then forwards the message yet again to $T3_{90}$. For cluster 100, sender $S1_{100}$ sends a third message to $R1_{100}$ which forwards to $T1_{100}$. $T1_{100}$ then forwards third message to $W1_{100}$, $W2_{100}$ and $W3_{100}$.

Figure 4:
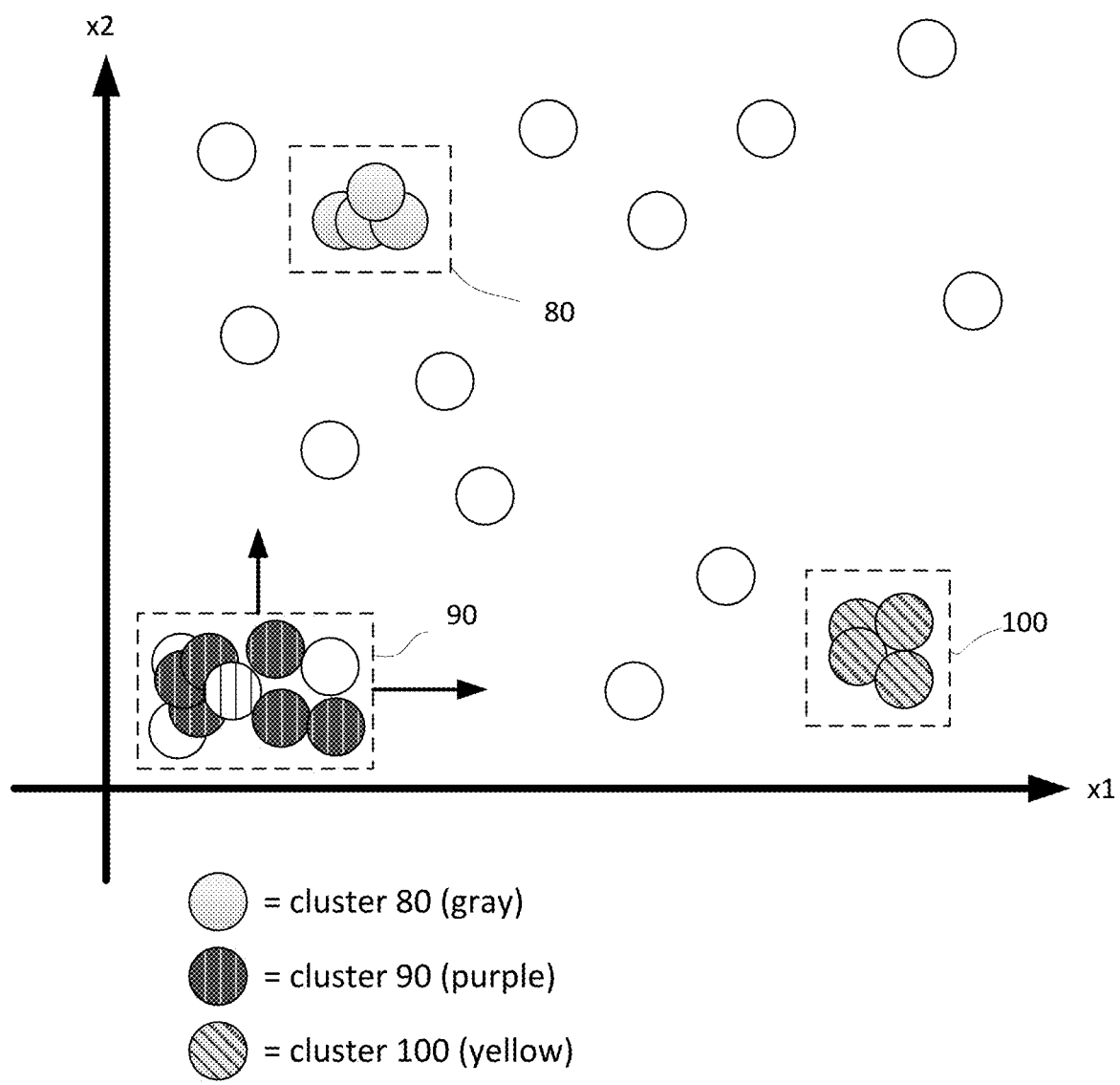
FIG. 4 is a graph showing the identification of a message cluster for a specific message growing in size.
Figure 5:
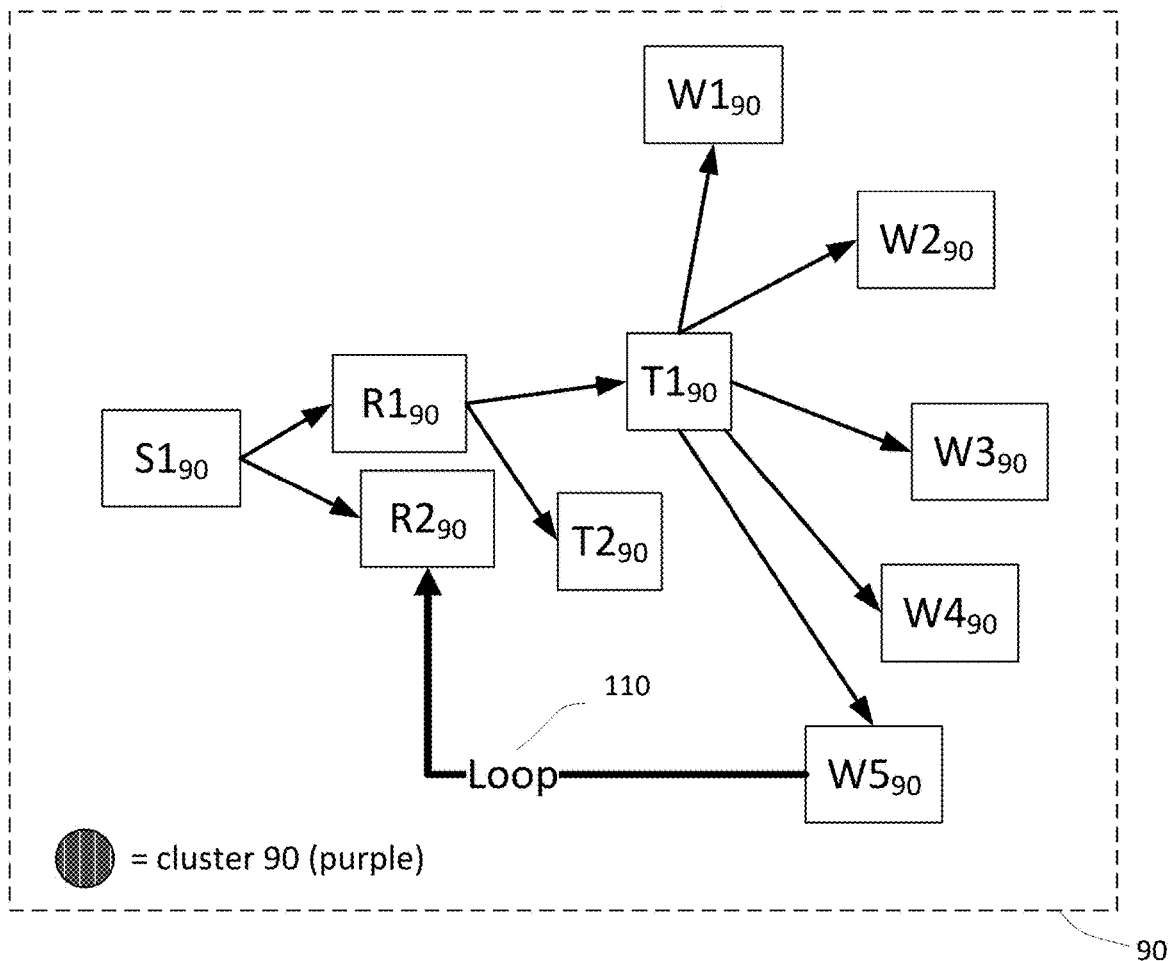
FIG. 5 is a diagrammatic view of a looping message.

FIG. 4 shows cluster 90 growing in size which is an indicator of possible flooding activity. FIG. 5 shows the invention detecting looping 110 from $W5_{90}$ to $R2_{90}$ of the second message.

Detected sender loops are identified from a suspect cluster built over the first and second intervals (and possibly many more) having three parameters including counts of connected nodes (e.g., breadth and depth of a graph), rate of growth and number of loops (and an associate metric being the number of nodes in a given loop).

Triggers to Call Out Automated Actions

There are two approaches to identify triggers that call out for automated action. The first trigger is a function of the three parameters discussed above. It may be rules-driven that can be configured for multi-level alerts at different severity. For example, a graph of depth of say 100 in a time period of 5 minutes with a breadth of 10,000 nodes results in Action 1 at Warning Level 1 which blocks senders at the root nodes of the graph. If this graph continues to grow in next 5 seconds and if the depth increases by some percentage then an event is fired to take Offensive Action 2 that results in blocking content or similar content for specified time and block.

Data for the above said rules could be derived based on the historical data of spread of unwanted messages. Using this data, thresholds for the above said parameters can be set in isolation and combination for defining automated actions. This is with an understanding that thresholds can be adjusted depending on the experience.

The second approach is based on machine learning using anomaly detection. This approach is based on the analysis of social networks of senders which involves analysis of social graphs of connectivity based on previous message exchanges which form training data set. The machine learning algorithm learns the pattern of who talks to whom and how the network of communication of a topic grows and at what rate and builds a model. When there is an incident/event of flooding, the Machine Learning model flags the communication as an anomaly that results in execution of one or more actions.

Figure 6:
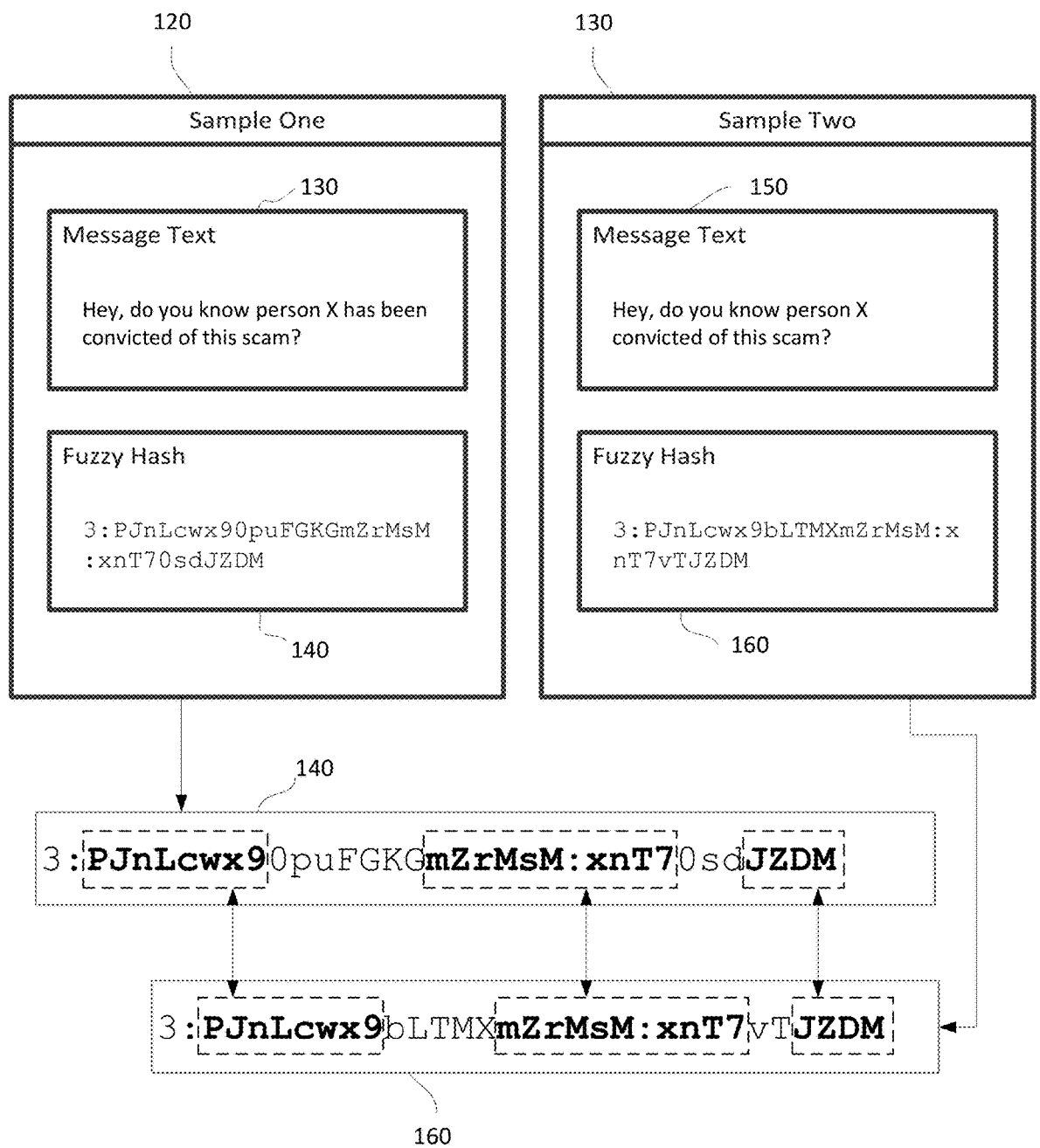
FIG. 6 is a diagrammatic view of fuzzy hashing in comparing two similar, but not identical text strings.

FIG. 6 shows two messages being compared, sample one 120 and sample two 130. Text string 130 of sample one 120 reads "[h]ey, do you know person X has been convicted of this scam?" Text string 150 of sample two 130 reads "[h]ey, do you know person X convict of this scam?" The two text strings are similar but not identical. A traditional hash would result in a binary, negative result as the two messages are not homologs. However, each text string is processed with a fuzzy hash algorithm resulting in fuzzy hash 140 for text string 130 and fuzzy hash 160 for text string 150. A comparison of the two hashes show three common substrings that convey similarity between the text strings and thus can be used to cluster the messages together, even when the context is not identical.

Figure 7:
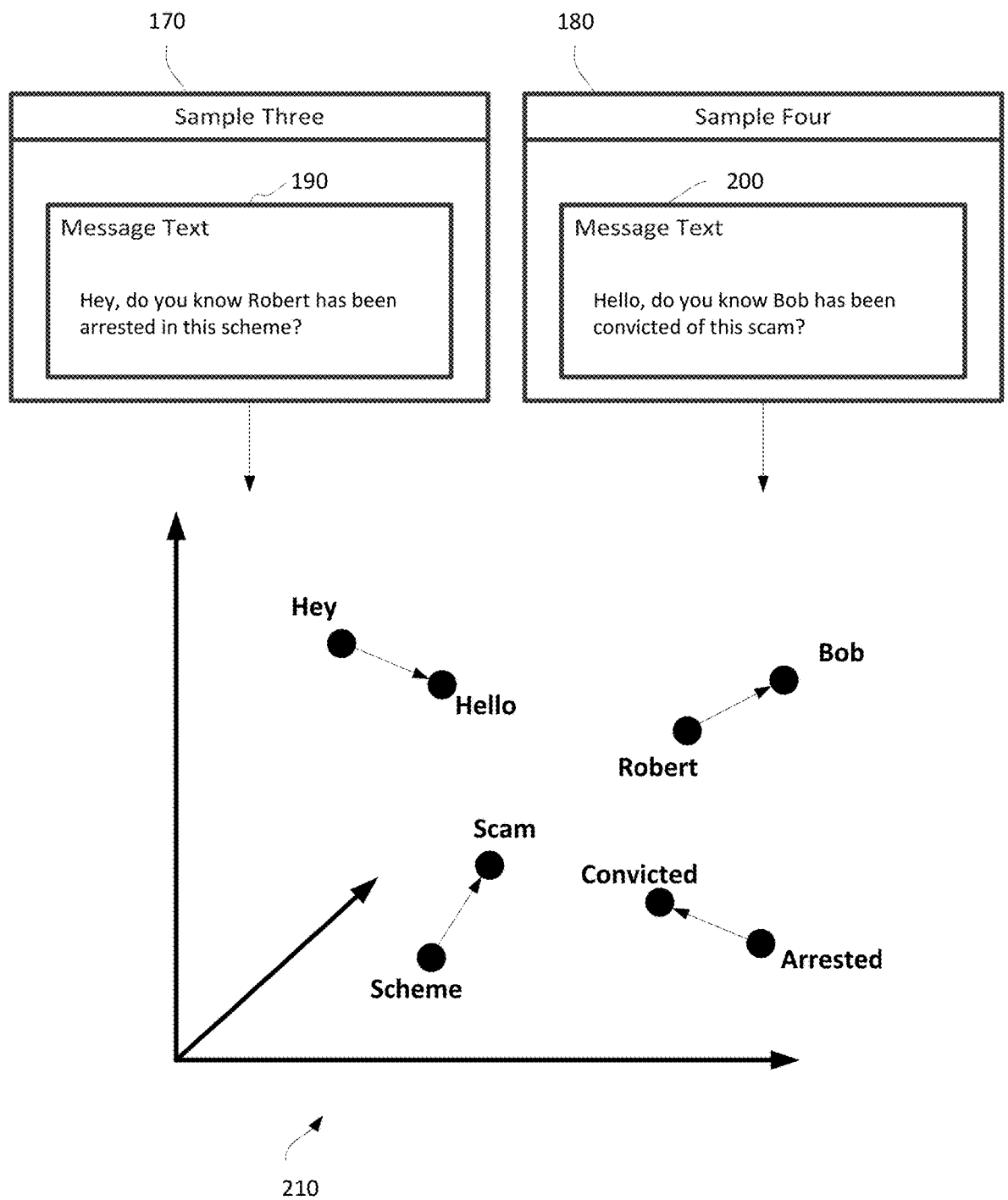
FIG. 7 is a diagrammatic view of word embedding in comparing to similar, but not identical text strings.

An alternative approach using word embedding is shown in FIG. 7. Message text string 190 reads "[h]ey, do you know Robert has been arrested in this scheme?" Message text string 200 reads "[h]ello, do you know Bob has been convicted of this scam?" Graph 210 shows four vectors created in a space. Word vectors are positioned in the vector space such that words that share common contexts (e.g., 'hello' and 'hey') in the corpus are located in close proximity to one another in the space. These word vectors can be used to create the clusters to detect messaging loops.

Figure 8:
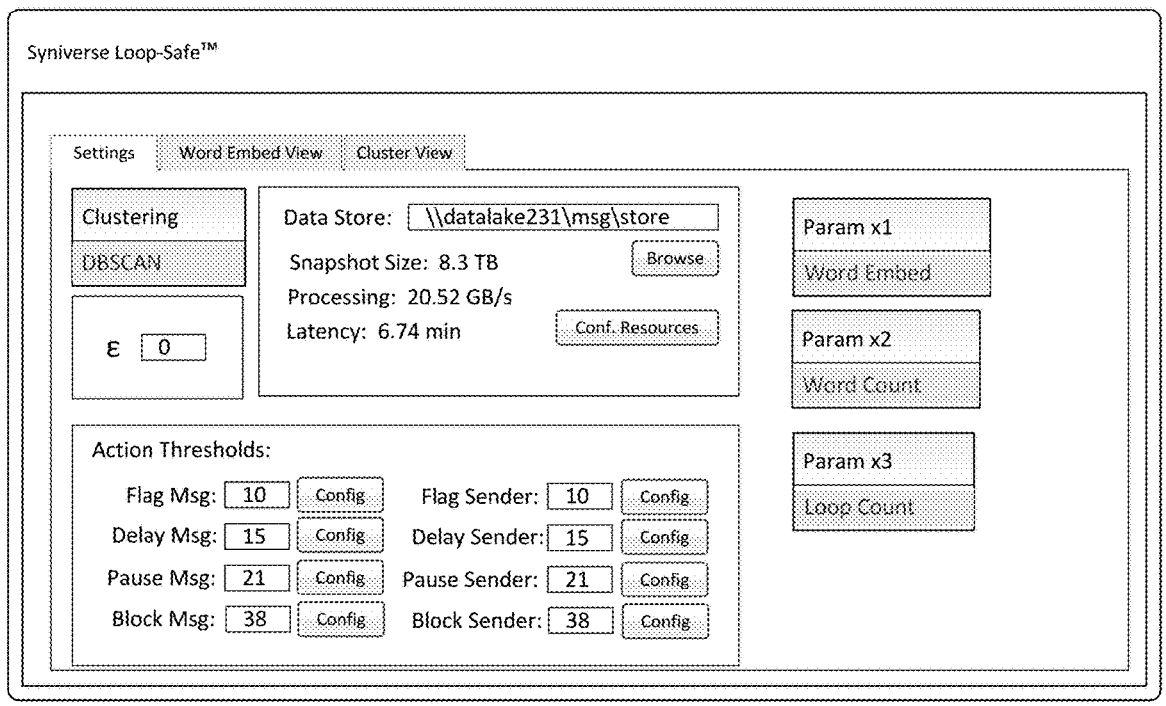
FIG. 8 is a user interface (UI) view of settings for message processing and monitoring according to an embodiment of the invention.
Figure 9:
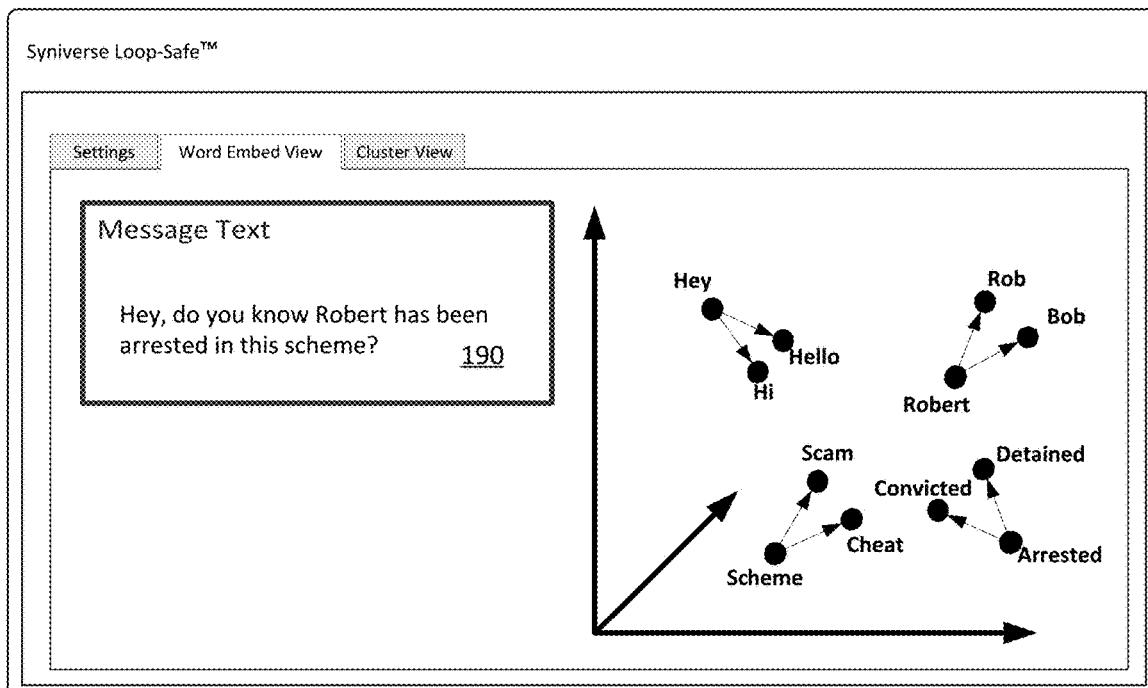
FIG. 9 is a user interface (UI) view of settings for viewing a word embedding graph according to an embodiment of the invention.
Figure 10:
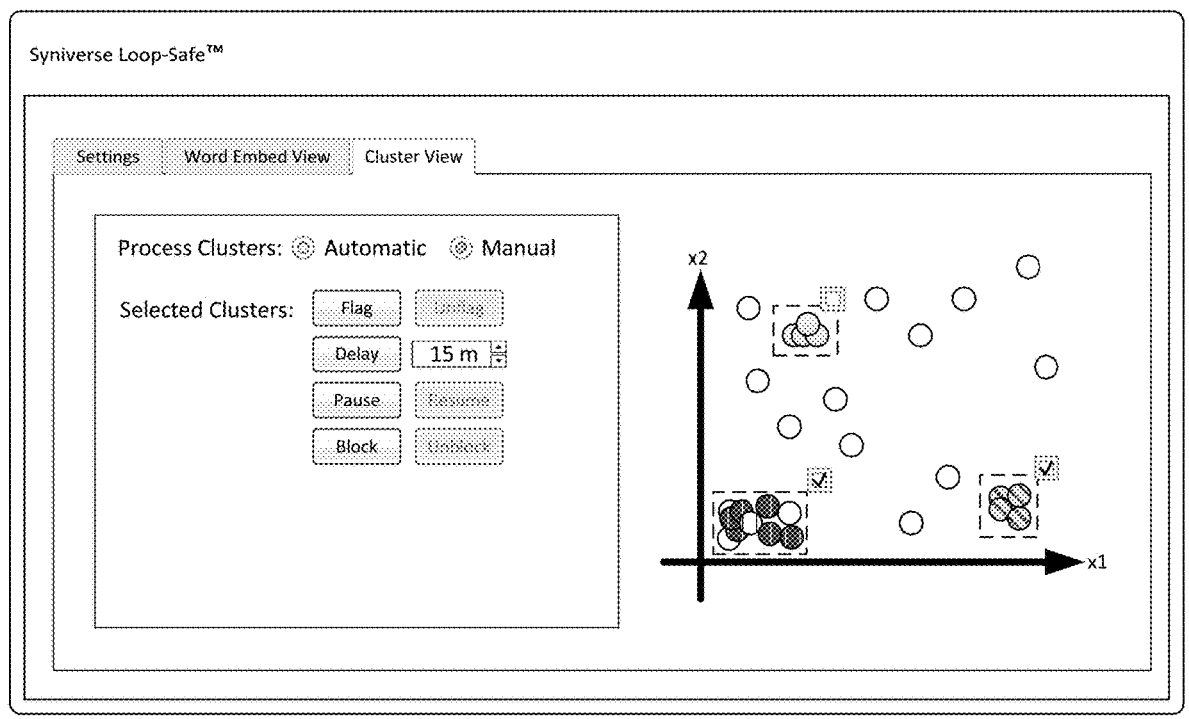
FIG. 10 is a user interface (UI) view of settings for viewing a cluster graph according to an embodiment of the invention.

In FIG. 8, a data store (or data lake) path is established to analyze a collection of messages. The clustering algorithm is set to DBSCAN and the eps value to zero. A first parameter is set for word embedding (but could be a fuzzy hash value), a second parameter is word count and a third parameter is a loop count wherein the message is received by a prior sender. Action thresholds for flagging, delay, pausing and blocking either/or the message or sender may be configured for automatic processing. FIG. 9 shows an expanded word embedding view of message text 190 wherein synonyms for words within message text 190 are vectorized. In FIG. 10, a cluster view is shown wherein bounding boxes are selectable manually for processing or the clusters defined within the bounding boxes may be processed automatically.

Just one unique distinction between this invention and the state of the art is that traditional messages examined bulk dissemination of largely identical messages that were largely unidirectional. For example, a mass email blast to random or targeted recipients. The advent of social media forward and sharing created new challenges in the dissemination of illegal, false, libelous, abusive and otherwise malicious communications that alphanumerically morph as they are disseminated. This is analogous to a viral mutation staying ahead of the vaccination. However, the present invention uses non-obvious techniques to find looping of message dissemination as an indicator of suspicious and potentially abusive traffic.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

Glossary of Claim Terms

Anomaly Detection (or outlier detection) means the identification of rare items, observations or occurrences by differing significantly from the majority of the data. These anomalies occur very infrequently but may signify a large and significant threat such as cyber intrusions or fraud. Methods of anomaly detection include one-class support vector machines, determination of records that deviate from learned association rules, distance-based techniques, replicator neural networks and cluster analysis-based anomaly detection.

Breadth (or breadth-first-search, BFS) means a graph traversal technique where a node and its neighbors are visited first and then the neighbors of neighbors.

Clustering (or cluster analysis) means aggregating a set of objects wherein objects in the same group (a cluster) have more similarities to each other that objects in other groups.

DBSCAN stands for Density-Based Spatial Clustering of Applications with Noise. DBSCAN is a density-based clustering algorithm which uses density function and widely used for the cluster of arbitrary shape. DBSCAN exploits the fact that cluster is a group of objects which are density reachable from the arbitrary core of object in the cluster. The DBSCAN algorithm basically requires 2 parameters: (1) eps: specifies how close points should be to each other to be considered a part of a cluster. If the distance between two points is lower or equal to this value (eps), these points are considered neighbors; and (2) minPoints: the minimum number of points to form a dense region. For example, if the minPoints parameter is set to 6, then at least 6 points are required to form a dense region.

Depth or Depth-First Search (DFS) means an algorithm for traversing or searching tree or graph data structures. The algorithm initiates at the root node (selecting some arbitrary node as the root node for a graph) and explores as far as possible along each branch prior to backtracking.

Edge means one of the connections between the nodes or vertices of a graph. For an undirected graph, an unordered pair of nodes that specify a line joining these two nodes are said to form an edge. For a directed graph, the edge is an ordered pair of nodes.

Fuzzy Hash is result of a hash algorithm that can identify files that contain a high percentage of similarities. Traditional hash algorithms (e.g., MD5) only identified homologous files that were exact copies. This is useful for authenticating the integrity of the original message. However, message forwards on P2P platforms contain additional data payloads (e.g., metadata) which obviate the use such algorithms. Fuzzy hashing is also known as context triggered piecewise hashes. Fuzzy hashes work by chopping up the input data into either fixed-size blocks, or blocks whose size depend on the input data. The blocks are further reduced into a smaller number of data values. Some example of fuzzy hash algorithms include SSDEEP, NILSIMSA, TLSH and SDHASH.

Loop means a traversal path in which a sender receives the same message that was sent earlier by the same sender. A loop exists when there exists at least one path that starts at a given node (of Sender) and traverses a set of nodes along a graph such that it lands back on the same sender.

Machine learning algorithm means a statistical process to give computer systems the ability to progressively improve performance on a specific task with data, without being explicitly programmed.

Message means a discrete unit of communication transmitted electronically over the Internet or other network system.

OTT (over the top) means providers that distribute electronic content directly to consumers over the Internet.

Spam means unsolicited messages sent in bulk by email or messaging applications or servers.

Streaming Machine Learning means a method of machine learning in which data becomes accessible in a sequential order and is used to forecast the best predictor for future data at each step. This is distinguished from batch learning techniques which generate the best predictor by learning on the entire training data set at once. Streaming machine learning may also be referenced as online machine learning and/or real-time machine learning. Streaming machine learning algorithms may dynamically adapt to new patterns in the data and/or when the data is generated as a function of time.

Tree means an undirected graph in which any two vertices are connected by exactly one path.

Word Embedding is a set of language modeling and feature learning techniques in natural language processing (NLP) where words or phrases from the vocabulary are mapped to vectors of real numbers.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of detecting a flood of unwanted messages, the method comprising the steps of:
   capturing a population of message data sent during a first interval, the message data including sender, recipient, content and submission time;
   applying a streaming machine learning algorithm to establish clusters of messages with the same content;

filtering out sparse messages;
repeating the processes for a second interval;
merging the clusters for the first and second interval;
constructing a network graph of clusters with each edge connecting a sender to a recipient; and
detecting sender loops wherein the detected sender loops are a suspect cluster built over the first and second intervals having parameters including counts of connected nodes; rate of growth and number of loops, whereby corrective action is taken to minimize the message traffic from the sender.

2. The method of claim 1 wherein the clusters are constructed by a Cartesian representation of a message's attributes comprising a plurality of parameters.

3. The method of claim 2 wherein the parameters for the Cartesian representation include a first parameter of the message on a first axis and a second parameter of the message on a second axis.

4. The method of claim 2 wherein the parameters are selected from the group consisting of message word count, message character count, message sentence count, message file size, word embedding, message fuzzy hash, message keywords, message attachment file size, message attachment file name, and message meta data.

5. The method of claim 1 wherein the machine learning algorithm is DBSCAN.

6. The method of claim 1 further comprising an associated metric for sender loops, the associated metrics is the number of nodes in a given loop.

7. The method of claim 1 wherein the corrective action is to restrict further transmission of the messages associated with detected sender loops.

8. The method of claim 7 further comprising the step of restricting further transmission activity of the sender.

9. The method of claim 8 wherein the restriction step is initiated responsive rule-derived from historical data of the spread of unwanted messages.

10. The method of claim 8 wherein the restriction step is initiated responsive to anomaly detection.

11. The method of claim 1 wherein the corrective action is to restrict further transmission from the sender associated with the detected sender loops.

12. A method of detecting a flood of unwanted messages, the method comprising the steps of:
capturing a population of message data sent during a first interval, the message data including sender, recipient, content and submission time;
applying DBSCAN to establish clusters of messages with the same content;
filtering out sparse messages;
repeating the processes for a second interval;
merging the clusters for the first and second interval;
constructing a network graph of clusters with each edge connecting a sender to a recipient;
computing the breadth and depth of the resultant tree of the graph;
detecting from the breadth and depth computations, suspect patterns in the network graph, the patterns selected from the group consisting of sender loops, excessive breadth of distribution and excessive depth of relay to sequential recipients whereby alerts are generated for the suspect patterns; and
automatically restricting further transmission of the messages with a cluster of messages having a suspect pattern.

13. The method of claim 12 wherein the processing and clustering steps are continuously repeated for subsequent intervals for ongoing detection of floods of unwanted messages.

14. A method of detecting a flood of unwanted messages, the method comprising the steps of:
capturing a population of message data sent during a first interval, the message data including sender, recipient, content and submission time;
processing message content to form feature vectors, the processing technique selected from the group consisting of word embedding and fuzzy hashing;
applying an algorithm to establish density clusters of messages with the same content;
repeating the processes for subsequent intervals;
merging the clusters for the first and subsequent intervals;
filtering out sparse messages and sparse individual clusters;
tagging metadata for each message, the metadata including sender and recipient for each data point in the cluster;
constructing a graph for each message in the cluster wherein the graph is directed from sender to recipient and is chronologically ordered;
for each message in the cluster, determining if the sender of the message is already a node in the constructed graph wherein the absence of the sender, two nodes are added, one for the sender and another for the recipient with a directional edge pointing from sender to recipient, wherein if the sender already exist and the recipient does not exist, adding a new node for the recipient and an edge with a timestamp, wherein if both sender and recipient nodes exist for the message in the constructed graph, add an edge from sender to recipient;
apply a loop detection algorithm to the graph resolving one or more metrics selected from the group consisting of traversal path, number of participants, and time elapsed for the looping;
computing the breadth and depth of the resultant tree of the graph;
detecting from the breadth and depth computations suspect patterns in the network graph, the patterns selected from the group consisting of sender loops, excessive breadth of distribution, anomaly detection and excessive depth of relay to sequential recipients whereby alerts are generated for the suspect patterns; and
automatically restricting further transmission of the messages within a cluster of messages having a suspect pattern, the restriction selected from the group consisting of sender blocking on a message delivery platform, sender blocking on the message receiving platform, content blocking on the message delivery platform and content blocking on the message receiving platform.

15. The method of claim 14 wherein in the sender blocking is temporary.

16. The method of claim 14 wherein the content blocking is temporary.

17. The method of claim 14 wherein the sender blocking delays eventual delivery of the message.

18. The method of claim 14 wherein the content blocking delays eventual delivery of the message.

19. The method of claim 14 wherein the detection of suspect patterns is performed by a machine learning algorithm.

* * * * *